United States Patent [19]

Usui et al.

[11] Patent Number: 5,185,850
[45] Date of Patent: Feb. 9, 1993

[54] COLOR TRANSFORMATION METHOD AND APPARATUS FOR TRANSFORMING PHYSICAL TO PSYCHOLOGICAL ATTRIBUTE USING A NEURAL NETWORK

[75] Inventors: Shiro Usui, 2-1 Higashiura, Kitayama-cho, Toyohashi-City, Aichi-Prefecture, 440; Shigeki Nakauchi; Masae Nakano, both of Toyohashi, all of Japan

[73] Assignees: Toyo Ink Mfg. Co., Ltd., Tokyo; Shiro Usui, Toyohashi, both of Japan

[21] Appl. No.: 621,058

[22] Filed: Nov. 30, 1990

[30] Foreign Application Priority Data

May 22, 1990 [JP] Japan .................... 2-132347

[51] Int. Cl.$^5$ ............................ G06F 15/18
[52] U.S. Cl. ........................ 395/22; 358/80; 395/21
[58] Field of Search ............ 364/513; 358/80; 355/38; 395/22, 25

[56] References Cited

U.S. PATENT DOCUMENTS

| 4,884,130 | 11/1989 | Huntsman | 358/80 |
| 5,015,856 | 5/1991 | Gold | 250/339 |
| 5,025,282 | 6/1991 | Nakamura et al. | 355/38 |

OTHER PUBLICATIONS

McClelland et al., Explorations in Parallel Distributed Processing, MIT Press, 1988, pp. 1-3, 137-152.
Usui et al., "A Three-Layered Neural Network Model for Color Vision", INNC Jul. 1990, pp. 492-495.
Liu et al., "Colour Image Processing by a Neural Network Model", INNC Jul. 1990, pp.3-6.
Godfrey et al., "Polar Backpropagation-Determining the Chromacity of a Light Source", INNC Jul. 1990, pp. 75-78.
Glover, D. E., "A Hybrid Optical Fourier/Electronic Neurocomputer Machine Vision Inspection System", source unknown, pp. 8-77 - 8-104.
Mead, C. A., Analog VLSI and Neural Systems, Addison-Wesley Pub., 1989, pp. 257-278.
Mueller et al., "Neural Computation of Visual Images", in an Intro. to Neural and Elec. Networks, 1990, pp. 131-153.
Usui et al., "Neural Network Model of Color Vision", Proceedings 11th Annual Intl. Conf. of the IEEE Engineering in Medicine and Biology, Nov. 1989, 2044-2045.
Grossberg et al., "Solving the Brightness-from-Luminance Problem: A Neural Architecture for Invariant Brightness Perception", Air Force Office of Scientific Research, AFOSR-TR-89-0457, Feb. 1989.
Liu et al. "Optical Processing of Imaging Spectrometer Data," SPIE Vol. 938, 1988, pp. 212-220.

*Primary Examiner*—Allen R. MacDonald
*Assistant Examiner*—Robert W. Downs
*Attorney, Agent, or Firm*—Martin A. Farber

[57] ABSTRACT

To practice a method of transforming color sensation informations such that multidimensional physical informations and color sensation informations sensed by living bodies in response to the physical informations are non-linearly transformed therebetween, a multilayer feedforward type neural network is used for the purpose of accomplishing the foregoing transformation. The physical informations are provided in the form of data derived from multidimensional spectral distribution of light and the color sensation informations are provided in the form of sensitive colors each sensed by the living bodies as a psychological quantity relative to a certain color. An apparatus for carrying out the method includes an input section into which a physical quantity is inputted as an electrical signal, an information transforming section in which the inputted signal is transformed into a color sensation information representing psychological quantity of color and an output section from which the transformed color information is outputted. The information transforming section includes a multilayer feedforward type neural network.

6 Claims, 6 Drawing Sheets

COLOR TRANSFORMATION METHOD AND APPARATUS FOR TRANSFORMING PHYSICAL TO PSYCHOLOGICAL ATTRIBUTE USING A NEURAL NETWORK

BACKGROUND OF THE INVENTION

1. Field of the Invention

The present invention relates generally to a method of transforming informations derived from color sensation informations sensed by living bodies (hereinafter referred to simply as color sensation informations) and an apparatus for carrying out the foregoing method. More particularly, the present invention relates to a method and an apparatus for processing color sensation informations such that informations given in the form of physical quantities are transformed into psychological quantities each representing a certain color sensed by living bodies and vice versa in order to assure that the apparatus can be utilized as a color sensor and, moreover, the apparatus can be utilized in many industrial fields associated with printing, building, dressing and so forth.

2. Description of the Prior Art

When it is required that a color possessed by a certain substance is exactly specified in many fields associated with printing, building, dressing and others, the color is generally represented by a mark or a numeral. For example, with respect to an unit for processing color informations, three primary colors (comprising a red (R), a green (G) and a blue (B)) inputted from a scanner or a camera to represent a certain color or a three-dimensional coordinate (i.e., a color representing system including X-, Y- and Z-coordinate axes) identified by a linear combination of the three primary colors are used. In addition, an operation such as color modification, color transformation or the like is performed by using marks and/or numerals.

Figure 6:
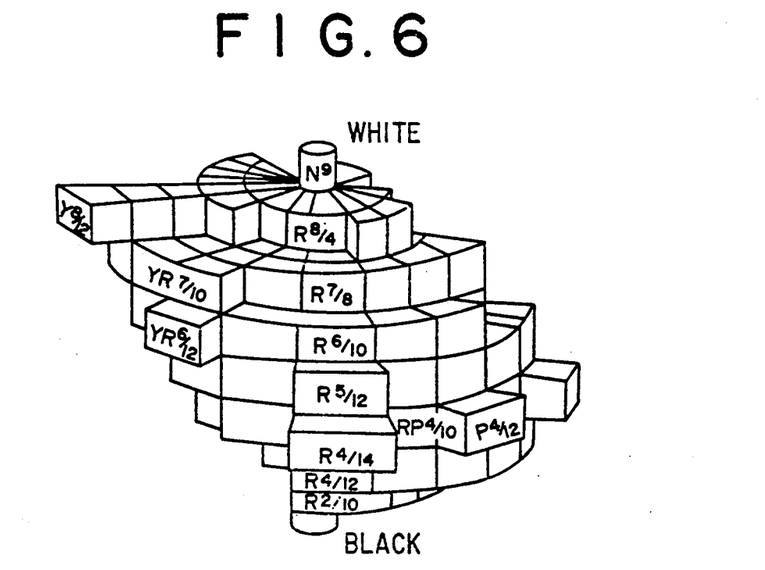
FIG. 6 is a perspective view which shows a color solid representing arrangement of a plurality of colors in the Munsel color system.

On the other hand, a Munsel color system is one of color representing systems to be used when it is required that a color possessed by a certain substance is exactly specified in many fields associated with printing, building, dressing and others. The Munsel color system is built based on color sensation of a human being such that all colors possessed by substances are arranged in a three-dimensional space with three properties of lightness (V), Hue (H) and chroma (C) as a scale in order that each of the colors is identified by marks and/or numerals (see FIG. 6).

Figure 5:
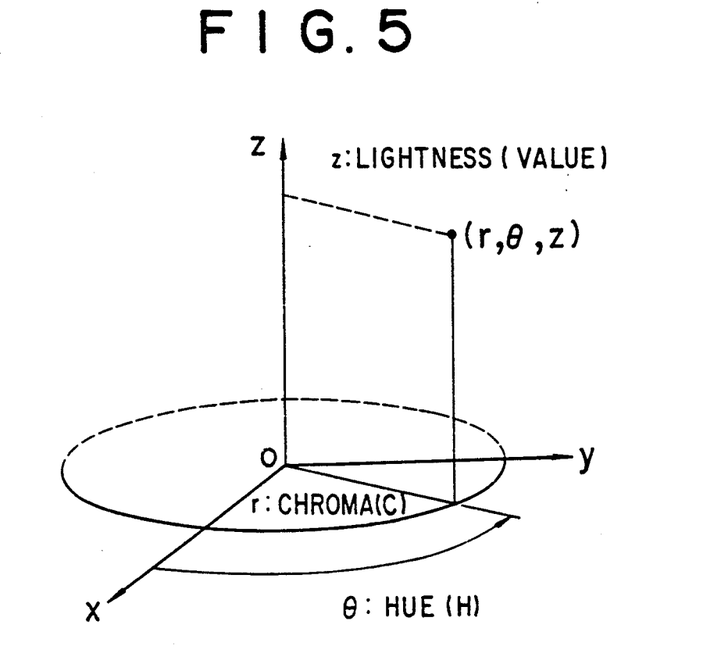
FIG. 5 is an illustrative view which schematically shows a relationship between a cylindrical coordinate and a physiological quantity of a certain color in a Munsel color system.

Specifically, with respect to achromatic colors in the Munsel color system, variation of brightness values ranging from black to white are represented by actual numerals ranging from 0 to 10 such that a quantity of variation of the brightness value corresponding to one calibration is equally sensed by eyes of a human being. On the other hand, with respect to chromatic colors in the Munsel color system, the same lightness of a certain chromatic color sensed by a human being as that of a certain achromatic color is referred to as a lightness of the chromatic color. $\theta$ of a polar coordinate $(r, \theta)$ on the equilightness plane represents a hue and r of the same represents a chroma (see FIG. 5). Concretely, every hue is divided into a group of colors located adjacent to each other in accordance of an order of 10 colors, i.e., R (red), YR (yellowish red), Y (yellow), GY (greenish yellow), G (green), BG (blueish green), B (blue), PB (blueish purple), P (purple) and RP (redish purple). In addition a circumference of 360 degrees is divided into 10 sections such that a group of colors is annularly arranged along the circumference including ten sections and color phases in the group of colors are represented by calibrations of real numerals ranging from 0 to 10. Thus, every hue is arranged such that they vary continuously in the region covering one group of colors as well as in the boundary between one group of colors and the adjacent group of colors so that a quantity of variation corresponding to one calibration is equally sensed by a human being at all locations. On the other hand, with respect to the chroma, an achromatic color is represented by 0 and a most lightness color is represented by 16 so that all the chromas are represented by a calibration corresponding to one of actual numerals of 0 to 16. Thus, a quantity of variation of a chroma corresponding to one calibration between different hue is equally sensed by a human being.

Therefore, with respect to a certain single property, a distance between two points in the foregoing space (i.e., Munsel color space) is determined in proportion to the sensitive difference between two points associated with the relevant property.

In the Munsel color system, e.g., designation of 10RP7/8 represents that the hue (Hue) is equal to 10 RP, the lightness (Value) is equal to 7 and the chroma (Chroma) is equal to 8. In this manner, a standard color chart is issued to each color of which coordinate is represented by an integral in the same way as the aforementioned example. However, with respect to a color of which coordinate is not represented by an integral, the color can be detected in the form of an image by the sensation of a human being via interpolation based on the standard color chart.

It has been known as an important thing that the foregoing color system can be obtained merely by linear combination of the aforementioned primary three colors (R, G, B).

As will be apparent from the above description, the Munsel color system provides a method of representing a color in conformity with color sensation of a human being and has an advantage that its structural mechanism can readily be understood and recognized by an ordinary person.

However, it is certain that the color charts can readily be understood and recognized by an ordinary person but they have a drawback in that they can not serve as an invariable scale for indicating each color because they vary due to undersirable deterioration of pigment contained in each color chart or the like substance as time elapses. In fact, this problem has been solved by represneting each color using its physical properties.

Spectral distribution represented by a spectral reflectance, a spectral transparency or the like is one of the foregoing physical properties inherent to each color. Specifically, with respect to a component spectrum at each wavelength of standard illumination, such a rate that the standard illumination is reflected at the surface of a substance or penetrates through a medium when standard illumination is radiated to the surface of the substance or through the medium varies depending on the kind of a color of the substance but does not vary with a same color. The functions representing a wavelength $\lambda$ specific to each color is called a spectral reflectance function or a spectral transparency function, and a spectrophotometer for measuring a value derived from each function at the wavelength λ has been heretofore known.

Although distribution of spectral intensity is a physical value and therefore it is an objective value, it is difficult for an ordinary person to detect a certain color in the form of an image based on the foregoing value.

A spectrophotometer for measuring distribution of spectral intensity and then displaying it in X-, Y- and Z-coordinates in view of the aforementioned fact has been heretofore known.

As in the case of representation of the three properties, representation in X-, Y- and Z-coordinates belongs to a method of arranging colors in a three-dimensional space. The coordinates employed for the purpose of representation provide artificial values derived upon arithmetic processing as three primary colors of their linear combination based on the distribution of spectral intensity in the above-described manner. On the other hand, with respect to a visual neural system of a human being, it has been known that multidimensional physical data are non-linearly transformed into a lower dimensional space, and color sensation is accomplished based on the foregoing non-linear transformation. However, since a distance between two points in the color space including X-, Y- and Z-coordinates is not determined in proportion to the sensitivity of a human being, it is very difficult for a color having no color chart to be detected in the form of an image by interpolation. For this reason, there arises a problem that a color operation or the like performed by using the conventional linear combination of the three primary colors, i.e., R, G and B is slightly deviated from the sensation of a human being.

SUMMARY OF THE INVENTION

The present invention has been made with the foregoing background in mind.

An object of the present invention is to provide a method and an apparatus for transforming color sensation informations between a physical quantity and a physiological quantity in conformity of color sensation of a human being in order to reduce a quantity of deviation of a color operation or the like from the sensation of a human being wherein the physical quantity, e.g., a set of values derived from sampling of a spectral intensity on the wavelength coordinate axis with which an arbitrary color can exactly be represented but which is hardly recognized by an ordinary person is given as data thereby to know a color coordinate based on three properties of color, i.e., lightness degree, hue and chroma or color sensation which can readily be transformed into them, whereby the color can easily be detected by an ordinary person in the form of an image.

The apparatus of the present invention transforms a physical quantity, such as spectral reflectance of the substance or color, representing value derived from the spectral reflectance to the scale recognisable by color sensation of a human being such as lightness, hue and chroma.

The apparatus of the present invention can provide the means to represent color appearance which is difficult for a human being to detect through the ordinary color specification system, and to reduce deviation of a color operation or the like from the sensation of a human being. As a result, the invention provides color indication value or chrominace which is easily detectable for an ordinary person.

The apparatus of the invention can be used as encoder or decoder for transformation of color multidimensional physical information to three dimensional information and, as a result, an isometric transformation of the color multidimensional information with a small quantity of information can be executed.

To accomplish the above object, there is provided according to one aspect of the present invention a method of transforming color sensation informations such that multidimensional physical informations and color sensation informations sensed by living bodies in response to the physical informations are non-linearly transformed therebetween, wherein a multilayer feedfoward type neural network is used for the purpose of accomplishing the foregoing transformation.

Usually, the physical informations are provided in the form of data derived from multidimensional spectral distribution of light, and the data are sampled on a frequency coordinate axis in respect of a spectral intensity of light. In addition, the color sensation informations are provided in the form of sensitive colors each sensed by the living bodies as a psychological quantity relative to a certain color.

The physical quantity inputted is a spectral reflectance of the substance or color indication such as X-, Y-, and Z-cordinate values derived from the spectral reflectance. Such spectral reflectance is represented as a function of wave length ratio of a reflected beam and an emitted beam.

Further, according to other aspect of the present invention, there is provided an apparatus for transforming color sensation informations such that multidimensional physical informations and color sensation information sensed by living bodies in response to said physical informations are non-linearly transformed therebetween, wherein said apparatus includes an input section into which a physical quantity is inputted as an electrical signal, an information transforming section in which said inputted signal is transformed into a color sensation information representing a psychological quantity of color and an output section from which the transformed color, sensation information is outputted, said information transforming section including a multilayer feedfoward type neural network.

Further, according to other aspect of the present invention, there is provided an apparatus for transforming color sensation informations such that multidimensional physical informations and color sensation informations sensed by living bodies in response to said physical informations are non-linearly transformed therebetween, wherein said apparatus includes an input section into which a psychological quantity of a certain color is inputted as an electrical signal, an information transforming section in which said inputted signal is transformed into an information representing a physical quantity of said color and an output section from which said transformed information representing said physical quantity of said color is outputted, said information transforming section including a multilayer feedfoward type neural network.

This transformation section transforms the color information represented by electric signal to a color indication which is easily detectable by color sensation of a human being. When the transformation is executed, an electric signal of the spectral reflectance or the color indicating value derived from the spectral reflectance is inputted to the feedforward type neural network, and a color indication value which is easily detectable by color sensation of a human being is outputted. This neural network is set initially by its training function to perform the transformation smoothly. The output section can output the physical quantity or chrominance derived from a physical quantity.

BRIEF DESCRIPTION OF THE DRAWINGS

The present invention is illustrated in the following drawings in which:

FIG. 1 illustrates the structure of a neutral network employable in a transforming section for a method and an apparatus for transforming color sensation informations in accordance with an embodiment of the present invention, wherein

DESCRIPTION OF THE PREFERRED EMBODIMENTS

Now, the present invention will be described in detail hereinafter with reference to the accompanying drawings which illustrate a few preferred embodiments of the present invention.

According to the present invention, in a case where a physical quantity is transformed into a psychological quantity, the physical quantity such as a spectral intensity of light or the like is transformed into an electrical signal in an input section.

The inputted signal is then transformed into a psychological quantity representing a certain color by a multilayer feedfoward type neural network in an information transforming section, and a transforming function of the information transforming section is preset by using a learning function of the neural network. In fact, two proposals have been made as to a method of presetting the transforming function.

For example, in a case where the physical quantity is to be transformed into a psychological quantity representing a certain color (e.g., a three-dimensional right-angled coordinate corresponding to a cylindrical coordinate in the Munsel color system) on the assumption that distribution of spectral intensity is given as a physical quantity, a first method is used as a method wherein a multilayer feedfoward type neural network A is prepared such that the neural network A includes an input layer, an output layer and a hidden layer composed of three or more layers, a middle layer located intermediate of the hidden layer includes three units, and the input layer and the output layer include a plurality of units of which number is more than three, respectively. In addition, plural sets of data on spectral distribution of light of which psychological quantity is known in respect of a certain color are given to the input layer as an input pattern and the same data as those on an input pattern are given to the output layer as a teacher signal thereby to learn a network, whereby the range from the input layer to the middle layer in the neural network A which has completed the learning operation is used as neural network B for the information transforming section. With the first method, identity transformation is accomplished by the neural network A with a most excellent accuracy of approximation so that an information on a psychological quantity of color is outputted to the three units in the middle layer of the neural network A which has learned the identity transformation. Thus, the middle layer of the neural network A composed of three units is used as an output layer of the neural network B.

A second method is used as a method wherein a multilayer feedfoward type neural network A is prepared such that the neural network A includes three or more layers, an input layer includes a plurality of units of which number is more than three (e.g., eighty one), and an output layer includes three units. In addition, informations on a physical quantity, i.e., plural sets of data on spectral distribution of light of which psychological quantity is known in respect of a certain color are given to the input layer as an input pattern and the known psychological quantity associated with the spectral distribution of light is given to the output layer as a teacher signal thereby to learn a network, whereby the neural network A which has completed the learning operation is used as a neural network B for the information transforming section as it is.

With either of the aforementioned two methods, when the data on the spectral distribution of light to be transformed are inputted into the input layer of the neural network B, the psychological quantity of the relevant color is outputted from the output layer of the neural network B.

The above description is concerned with the case where the spectral distribution of light is transformed into a psychological quantity of the relevant color. In a case where the psychological quantity of a certain color is transformed into spectral distribution of light, a neural network C is used such that the middle layer in the hidden layer of the neural network A which has completed the learning operation is included as an input layer and the output layer of the neural network A is included as an output layer for the neural network C. Alternatively, another neural network C is prepared such that the neural network C includes three or more layers, an input layer includes three units and an output layer includes a plurality of units of which number is more than three. With this neural network C, a psychological quantity is given to the input layer and spectral distribution of light is then given to the output layer as teacher data thereby to learn a network so that the neural network C which has completed the learning operation is used as an information transforming section. In either case, physical quantities and psychological quantities each representing a certain color are transformed therebetween.

Figure 1A:
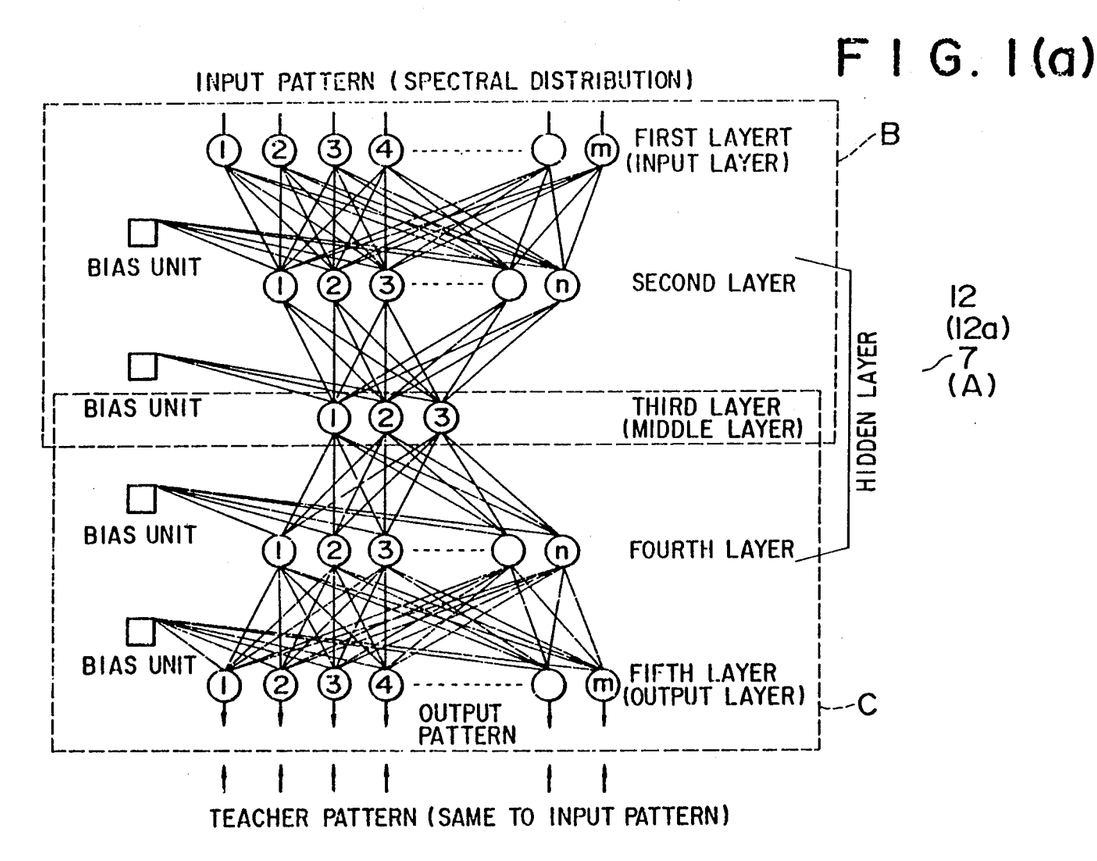
FIG. 1(a) illustrates a method of learning the neural network and FIG. 1(b) illustrates the structure of the transforming section for which the neural network which has completed a learning operation by employing the method as shown in FIG. 1(a) is used.
Figure 1B:
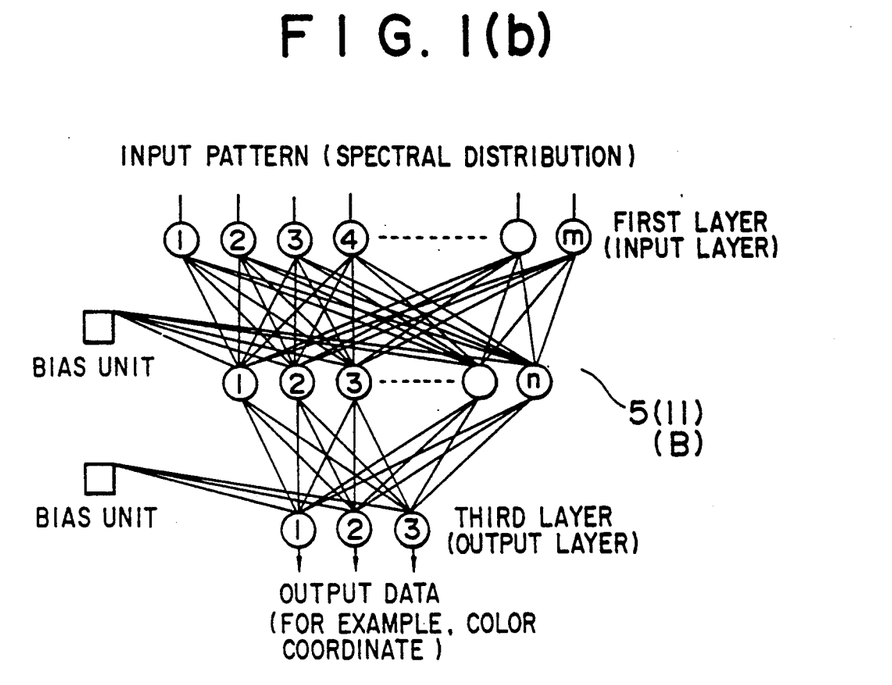

FIG. 1(a) and FIG. 1(b) are an illustrative view which schematically shows by way of example a method and an apparatus for processing informations derived from color sensation in accordance with an embodiment of the present invention, respectively, wherein the informations each inputted into the apparatus are represented in the form of spectral distribution of light and a quantity of color sensation to be processed in the apparatus is sensed by a living body as a psychological quantity. It should be noted that a three-dimensional right-angled coordinate corresponding to a cylindrical coordinate in the Munsel color system in the one-to-one relationship is used for carrying out the present invention.

Figure 2:
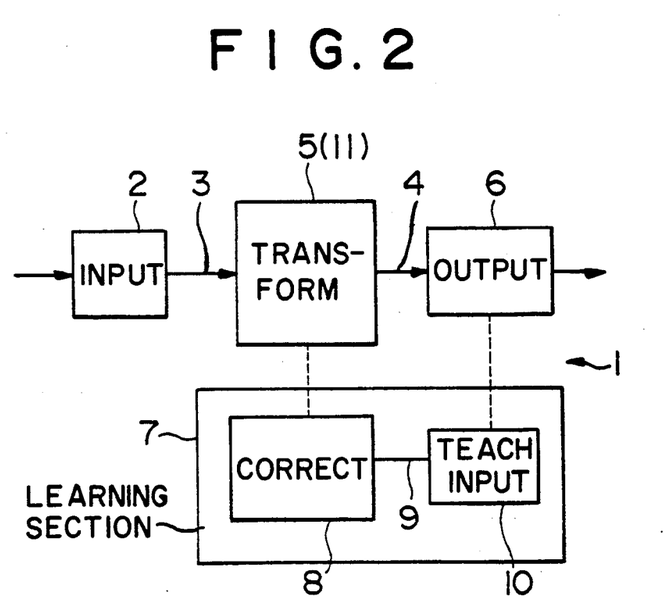
FIG. 2 is a block diagram which schematically illustrates the apparatus for transforming color sensation informations in accordance with the present invention.

FIG. 2 is a block diagram which schematically illustrates a structure of the apparatus for processing informations derived from color sensation in accordance with the embodiment of the present invention. In the drawing, reference numeral 1 designates an apparatus for transforming informations derived from color sensation. Specifically, the apparatus 1 is composed of an input section 2 for receiving a pysical quantity, a transforming section 5, an output section 6 for outputting a psychological quantity of color and a learning section 7 for learning a neural network in the transforming section 5. The learning section 7 includes a correcting section 8 and a teacher signal inputting section 10.

First, description will be made below as to a case where physical quantities are transformed into psychological quantities. In this case, the input section 2 serves to produce a number of informations each representing a physical quantity, i.e., a number of primary dimensional data $S_i$ (i=1, 2, 3, ..., m) of which spectral intensity derived from a spectral analysis of light is sampled on a frequency coordinate axis. Usually, a commercially available spectrophotometer is used for the input section 2. For example, within the range of 380 to 780 nm, the number m of data is eighty one based on a sampling operation to be performed at eight one positions, i.e., 380, 385, 390, ..., 780 (nm) each located at an interval of 5 nm. Each of the data $s_i$ is transformed in the input section 2 into an electrical signal 3 which in turn is outputted to the transforming section 5.

In response to the inputted signal 3, the transforming section 5 serves to transform an information 4 derived from color sensation into a component on the cylindrical coordinate corresponding to a combination of brightness value, color phase and chroma in the Munsel color system or a component in the three-dimensional right-angled coordinate corresponding to the cylindrical coordinate in the one-to-one relationship. In practice, the transforming section 5 is constructed by a multilayer feedfoward type neural network 11.

The neural network 11 is composed of three layers, and a first layer (input layer) includes m units (e.g., eighty one units). In addition, a second layer includes n units and a third layer has three units of which number, i.e., three is determined based on the fundamental number of color sensation in consideration of three properties of each color. As desired, a bias unit adapted to output a numeral 1 at all times may be added to each layer.

The neural network 11 executes the following steps of processings for allowing the signal 3 to go to an output layer in the forward direction via an input layer and an intermediate layer.

When, it is assumed that an output value from an unit i in the input layer is designated by $I_i$ (i=1, 2, 3, ..., m), an output value from an unit j in the hidden layer is designates by $H_j$ (j=1, 2, 3, ..., n), an output value from an output unit k in the output layer is designated by $O_k$ (k=1, 2, 3), a connecting coefficient for connecting the unit i in the input layer to the unit j in the hidden layer is designates by $W_{ij}$, a connecting coefficient for connecting the unit j in the hidden layer to the unit k in the output layer is designated by $W_{kj}$, a quantity of offsetting of the unit j in the hidden layer is designated by $\theta_j$ and a quantity of offsetting of the unit k in the output layer is designated by $\theta_k$, the output value $H_j$ and the output value $O_k$ are represented by the following equations (1) and (2).

$$H_j = f\left(\sum_{i=1}^{m} i_i \cdot W_{ji} + \theta_j\right) \quad (1)$$

$$O_k = f\left(\sum_{j=1}^{n} H_j \cdot W_{kj} + \theta_k\right) \quad (2)$$

Here, the following sigmoid function f which does not decrease in a monotonous manner within the range of (0, 1) is generally used for the function f in the above equations (1) and (2).

$$f(x) = 1/\{1 + \exp(-x)\} \quad (3)$$

Values from the output layer are specifically determined by a plurality of transformation coefficients such as the connecting coefficients $W_{ji}$ and $W_{kj}$, the offset values $\theta_j$ and $\theta_k$ and others. In practice, these values are formed in the learning section 7 to be described later, by learning a neural network (e.g., in accordance with a back propagation learning algorithm). The back propagation learning algorithm represents an algorithm wherein a teacher signal is given to the layered structure type neural network including an input layer, a hidden layer and an output layer and the connecting coefficients and the offset values are adjusted in the inverse direction from the output layer to the input layer via the hidden layer so as to reduce an error with the connecting coefficients and the offset values in order to obtain a more desirable output value.

The learning section 7 is constituted by a multilayer neural network 12 for the purpose of performing the aforementioned learning. With respect to a structure of the learning section 7 as well as a method of performing a learning operation, two proposals have been made.

A first proposal is such that a neural network 12a is constituted by five layers, as shown in FIG. 1(a). Specifically, the neural network 12a includes an input layer, an output layer and a hidden layer composed of three layers, and a middle layer located intermediate of the hidden layer (representing a third layer in the whole neural network) includes three units. In addition, the input layer (first layer) and the output layer (fifth layer) includes a plurality of units of which number is more than three, respectively. For example, the first layer includes m (eighty one) units and the fifth layer includes m (eighty one) units. Additionally, the second layer and the fourth layer include, e.g., n (ten) units, respectively.

In this case, the learning method is practiced such that a spectral intensity at a sampling wavelength value distributed in the form of a spectral reflectance is given to the respective units (1), (2), ..., (m) as an electrical signal 3 having an input pattern with respect to each of a plurality of color charts selected at random from the Munsel color system and a same pattern is then given to the output layer (fifth layer) as a teacher signal to learn a network.

The neural network 12a which has learned an identity transformation with respect to the plural color charts carries out approximation for accomplishing exellent identity transformation in response to the inputted spectral distribution also with respect to a color other than the color charts which have been learned by generalization. At this time, representation based on the right-angled coordinate in the Munsel color system is formed in each of the three units in the third layer of the neural network 12a which has completed a leaning operation. Specifically, a three-dimensional coordinate corresponding to the cylindrical coordinate in the Munsel color system in the one-to-one relationship is outputted from each of the three units to determine whether or not correct representation has been accomplished also with respect to a color other than the color charts which have been learned.

To support the aforementioned operation of the neural network 12a, an experiment was carried out in the following manner.

Figure 7:
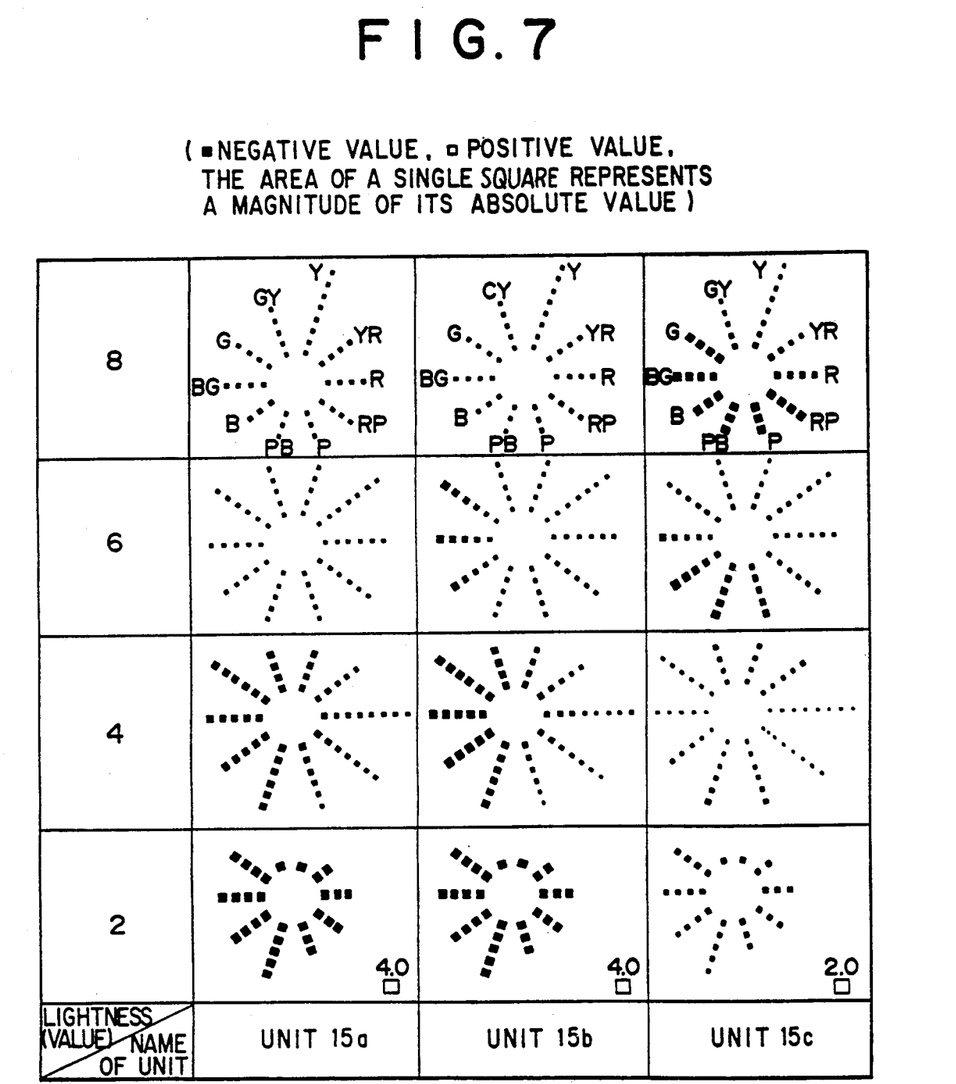
FIG. 7 shows a plurality of illustrative views each of which represents a relationship between outputs from three units and a lightness wherein the three units are included in a third layer (i.e., a middle in hidden layers) when a learning section is constituted by a neural network including five layers.

As shown in FIG. 7, in correct consideration of output values from the three units 15a, 15b, and 15c at the time when data on a spectral reflectance of each of the Munsel color charts comprising 1569 colors were inputted into the input layer of the neural network 12a which has completed a learning operation, the output values were shown at the positions corresponding to the points defined by the known lightness of the relevant color, the known hue on the equilightness plane and the known chroma such that a magnitude of each of square areas was determined in proportion to their absolute values, wherein each output value was represented by a square under the conditions that in a case where it assumed a negative value, it was identified by a black square and in a case where it assumed a positive value, it was identified by a white square. As a result derived from the experiment, it was found that an output value from one unit (herein designated by 15a) among the three units varied corresponding to the known lightness of the color identified by the relevant data.

Therefore, a mapping f corresponding to a lightness V representing an arbitrary output value s from the unit 15a can be found based on a collection of the output values from the unit 15a as well as a collection of the known lightnesses representing the relevant colors corresponding to the output values.

Figure 8:
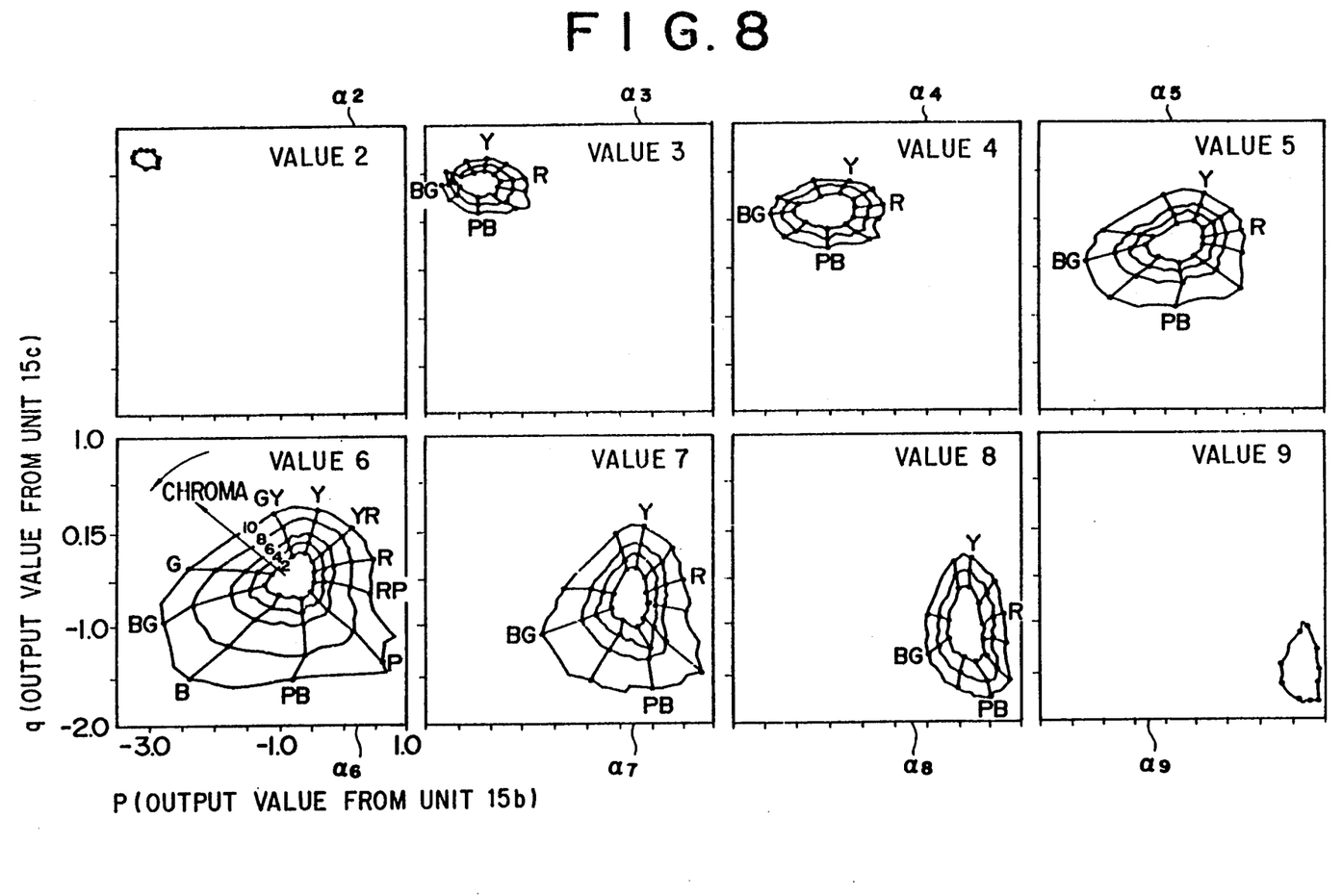
FIG. 8 shows a plurality of illustrative views each of which represents a relationship among a set of output data from the remaining two units among the three unit in the third layer, hues and chromas wherein each of the remaining two units represents a lightness and the learning section is constituted by the neural network including five layers.

When a set of output values from the residual two units 15b and 15c are plotted on the equilightness plane $a_V$ having the known lightness V of the relevant color, a plurality of equihue lines are scribed in the radial direction and a plurality of equichroma lines are annularly scribed, the result is as shown in FIG. 8. As is apparent from the drawing, arrangement of the respective colors on the plane $a_V$ correctly corresponds to arrangement of the colors on the equilightness plane having the lightness V in the Munsel color space. It should be noted that the colors each having a chroma O are arranged on the Z-coordinate in the Munsel color space and the coordinate on the equilightness plane is represented by (0, 0) but the coordinates representing the colors each having a chroma 0 on th plane $a_V$ differ from each other depending on the lightness V and thereby each of the foregoing coordinates assumes a different coordinate from the coordinate (0, 0).

However, since it has been found with respect to the lightnesses 2, 3, 4, 5, 6, 7, 8 and 9 that a set of output values from the units 15b and 15c correctly correspond to a set of hues and chromas on the equilightness plane associated wit the lightness of the relevant color, a mapping $g_{V_r}$ can be found wherein the mapping $g_{V_r}$ is such that a set of output values from the units 15b and 15c corresponds to a set of hues and chromas on the equilightness plane having the lightness $V_r$ (which assumes one value among the foregoing lightnesses 2 to 9 in the shown embodiment) with respect to an arbitrary color among the colors each having a specific lightness.

Additionally, with respect to an arbitrary lightness V other than the lightness $V_r$, a mapping $g_V$ can be found based on the corresponding relationship between an assembly ($V_r$) and an assembly ($g_{V_r}$), wherein the mapping $g_V$ is such that a set of output values from the units 15a and 15b derived from input data on the color having an arbitrary lightness V corresponds to a set of hues and chromas on the equilightness plane having a lightness V, e.g., in an interpolating relationship.

Thus, when a set of values of spectral reflectance at a plurality of wavelength values (eighty one wavelength values in the shown embodiment) with respect to an arbitrary color of which lightness, hue and chrome are unknown is given to the neural network 12a which has completed a learning operation, outputs are taken from the three units 15a, 15b and 15c in the middle layer (i.e., third layer), whereby an image representing the mapping f derived from the output values from the unit 15a assumes a lightness V and a set of outputs from the units 15b and 15c provides an image representing the mapping $g_V$ having certain lightness and chroma.

At this time, a set of outputs from the three units 15a, 15b and 15c (s, p, q) provides a three-dimensional coordinate which corresponds to a set of lightness, hue and chroma in the Munsel color system (V, H, C) in an one-to-one relationship, and this three-dimensional coordinate can be regarded as a kind of color coordinate which represents a psychological quantity of a certain color.

Therefore, the part ranging from the first layer to the middle layer (third layer) in the neural network 12a which has completed a learning operation can be used as a neural network 11 for the transforming section 5.

The output section 6 outputs sensitive informations outputted from the transforming section 5 i.e., components of the three-demensional right-angled coordinate corresponding to the cylindrical coordinate in the one-to-one relationship in the shown embodiment as they are, wherein the cylindrical coordinate corresponds to a set of lightnesses, hues and chromas in the Munsel color system. Alternatively, the output section 6 may output sensitive informations after they are transformed into the cylindrical coordinate corresponding to the foregoing informations. Further, the output section 6 may output sensitive informations after they are transformed into lightnesses, hues and chromas. To accomplish such transformation as mentioned above, it is required that a mapping for transforming an arbitrary spectral distribution of light into a set of lightnesses, hues and chromas of the respective colors is found out from an assembly of results derived from the transformation of the spectral distribution of a plurality of Munsel color charts in the transforming section 5 as well as an assembly composed of a set of lightnesses, hues and chromas representing the relevant Munsel color charts or an assembly composed of cylindrical coordinates representing the relevant Munsel color codes so that a function for accomplishing the foregoing transformation is established in the output section 6.

Figure 3:
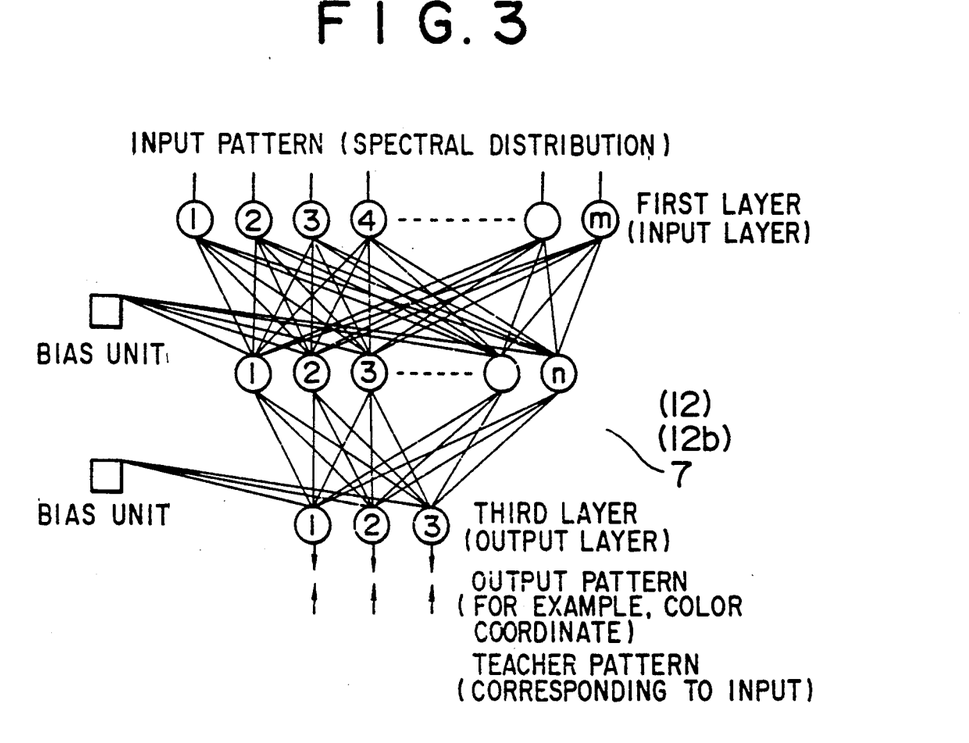
FIG. 3 is an illustrative view which shows the structure of a neutral network in a learning section of the apparatus for transforming color sensation informations in accordance with other embodiment of the present invention.

The second proposal is such that the neural network 12 (12b) is constituted by three layers as shown in FIG. 3. In this case, the aforementioned neural network 11 can be used as the neutral network 12 as it is. A learning method employable in this case is practiced such that with respect to each of a plurality of color charts (e.g., 1280 color charts) selected at random from the Munsel color chart, a spectral intensity at a sampling wavelength value having spectral distribution is given to respective units (1), (2), . . . , (m) in the form of an electrical signal 3 having an input pattern and moreover a cylindrical coordinate $(z, r, \theta)$ representing each color chart in the Munsel color system is given to the output layer as a teacher signal in the form of a right-angled coordinate $(x, y, z)$ which has been reformed from the cylindrical coordinate $(z, r, \theta)$.

The neural network 12b which has completed a learning operation with respect to the plural color codes outputs via generalization a correct color coordinate in response to the spectral distribution which has been inputted into the neural network 12b with respect to a color other than the color charts which have completed a learning operation. For the reason the neural network 12b can be used as a neural network 11 for the transforming section 5. In either case, a color sensitive value corresponding to a given physical quantity is outputted from the output section.

Next, description will be made below as to a case where a psychological quantity is transformed into a physical quantity.

When the third layer to the fifth layer are taken into account while the aforementioned identity transformation is carried out by the neural network 12a which has completed a learning operation, a color coordinate representing a psychological quantity of a certain color is inputted into the third layer and spectral distribution of the foregoing color of the color coordinate is outputted from the fifth layer.

Figure 4:
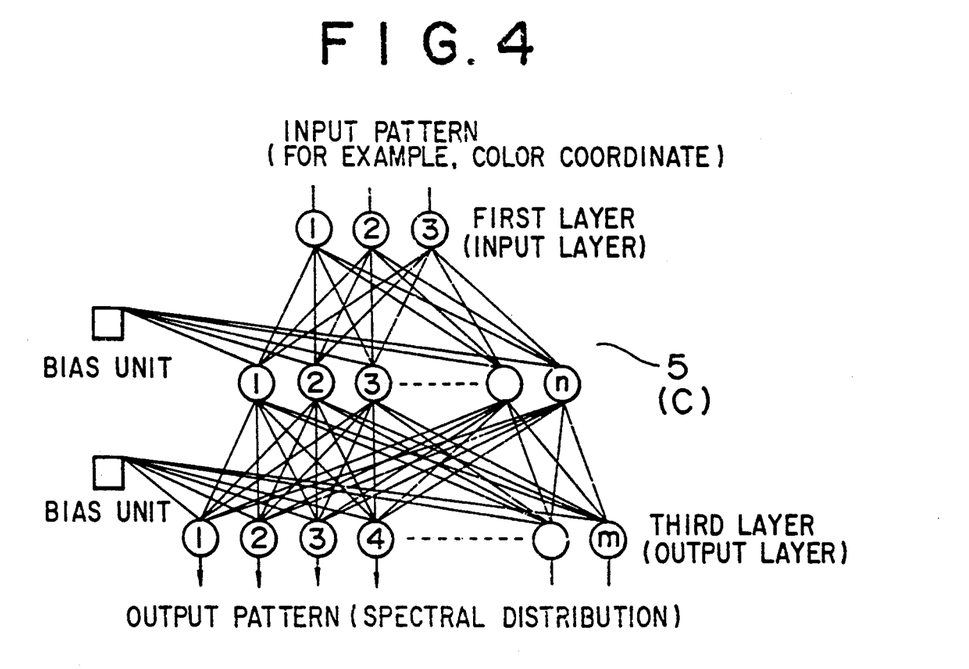
FIG. 4 is an illustrative view which shows the structure of a neutral network in a learning section of the apparatus for transforming color sensation informations in accordance with another embodiment of the present invention.

Here, a neural network C including as an input layer the third layer in the neural network 12a which has completed a learning operation and as an output layer the fifth layer in the same is taken into account (see FIG. 4). In practice, the neural network C can be used as a transforming section 5 for transforming the color coordinate $(p, p, q)$ representing a psychological quantity of a certain color into the spectral distribution representing a physical quantity.

Alternatively, the neural network C may be constructed such that a neural network having a three-layered structure which includes three units in the first layer, ten units in the second layer and eighty one units in the third layer is prepared from the beginning and thereby a network is learned with the color coordinate representing many color charts as an input pattern and with the spectral distribution of a certain color as a teacher signal.

Next, when data transformation from physical quantities into psychological quantities in accordance with the present invention is reviewed from the viewpoint of a quantity of data, a combination of lightness, hue and chroma or a color coordinate representing them is composed of three numerals and the spectral distribution is composed of eighty one numerals much more than three numerals. Accordingly, there is a possibility that another application may be achieved such that a psychological quantity composed of three numerals is used for the purpose of reserving or transmitting data and it is represented by a physical quantity composed of eighty one numerals, as required. In other words, compressed data can be reserved or transmitted as an output from the middle layer in the neural network which has completed a learning operation. In addition, the compressed data can be inputted in the middle layer in a neural network, e.g., located at another position and including a middle layer and an output layer.

It has been found from the results derived from a variety of experiments that eighty one, ten and three which have been exemplified above as a practical unit number for the respective layers make it possible for an effective learning operation having an ability of generalization to be performed.

It should be added that the methods and the units which have been used for practicing the aforementioned embodiment of the present invention can be applied not only for the purpose of transforming spectral distribution into a psychological quantity representing a specific color in the Munsel color system but also for the purpose of transforming the spectral distribution into a quantity of informations derived from color sensation in another non-linear psychological color system.

Additionally, another method of effectively transforming various physical quantities into a quantity of color sensation informations and an apparatus for carrying out the foregoing method can be provided by properly selecting the number of units constituting each layer in a neural network in the transforming section corresponding to a given physical quantity and a quantity of color sensation informations to be transformed.

It should be noted that the neural network which has completed a learning operation can be constructed in the form of an apparatus.

While the present invention has been described above with respect to a few preferred embodiments thereof, it should of course be understood that the present invention should not be limited only to these embodiments but various changes or modifications may be made without departure from the scope of the claim as defined by the appended claims.

As will be apparent from the above description, the method and the apparatus for transforming color sensation informations in accordance with the present invention can be used as a color sensor or the like. In addition, the method and the apparatus of the present invention can solve a problem on fine deviation of the color practically sensed by a human being from an actual color during a color operation in many industrial fields including printing and others. Further, the method and apparatus of the present invention can substantially reduce a quantity of color data. If it becomes possible to isometrically transmit color sensation informations in accordance with the present invention, this isometric transmission of the informations can be applied to many industrial fields including printing and others. In this case, since a transforming section as serving as a center for the method and the apparatus of the present invention is constructed by a neural network and this construction can practically be realized by employing a commercial neuro-computer, ther is no need of using a special unit. Thus, the method and the apparatus of the present invention can be employing for processing other informations. Accordingly, the method and the apparatus has a high degree of versatility.

What is claimed is:

1. A method of non-linearly transforming from multi-dimensional physical information to color sensation information sensed by living bodies comprising steps of
   transforming data of light in respect to a spectral distribution of light into the form of an electrical signal;
   sampling said data of light on a frequency coordinate axis in respect of a spectral intensity of light, said data describing a multidimensional spectral distribution of light;
   establishing a neural network by forming an input layer of three or more units, an output layer of three or more units, and three or more hidden layers having a middle hidden layer including three units;
   presenting said data on spectral distribution of light in the form of said electrical signal to said neural network as an input pattern as well as a teacher signal;
   training said neural network by use of said teacher signal; and
   extracting color sensation information from said middle hidden layer of said neural network, said color sensation information having a representation as a set of lightness, value, chroma, and hue in the Munsel color system, or as components in a cylindrical coordinate corresponding to said set of lightness, value, chroma, and hue, or in the form of a component in a three-dimensional rectangular coordinate corresponding to said cylindrical coordinate in a one-to-one relationship.

2. A method of non-linearly transforming from color sensation information sensed by living bodies to multidimensional physical information comprising steps of
   transforming data of light in respect to a spectral distribution of light into the form of an electrical signal;
   sampling said data of light on a frequency coordinate axis in respect of a spectral intencity of light, said data describing a multidimensional spectral distribution of light;
   establishing a neural network by forming an input layer of three or more units, an output layer of three or more units, and three or more hidden layers having a middle hidden layer including three units;
   presenting said data on spectral distribution of light to said neural network as an input pattern as well as a teacher signal;
   training said neural network by use of said teacher signal;
   outputting multidimensional physical information of light from said output layer in response to an inputting of said color sensation information data into said middle hidden layer in said neural network upon completion of said training of said neural network to serve as a multidimensional physical information representing said color, said color sensation information having representation as a set of value, chroma and hue in the Munsel color system, or as components in a cylindrical coordinate corresponding to said set of value, chroma and hue, or in the form of a component in a three-dimensional rectangular coordinate corresponding to said cylindrical coordinate in a one-to-one relationship.

3. An apparatus for transforming multidimensional physical information non-linearly into color sensation information sensed by living bodies, comprising
   an input section for transforming data of light describing a multidimensional spectral distribution of light into the form of an electrical signal and for sampling said data of light on a frequency coordinate axis in respect of a spectral intensity of light;
   an information transforming section connecting with said input section for transforming said electrical signal into a color sensation information sensed by living bodies, said information transforming section comprising a feed-forward type neural network comprising an input layer of three or more units, an output layer of three or more units, and three or more hidden layers having a middle hidden layer including three units, said neural network being operative with a learning operation for translation of multi-dimensional physical information of light, said input section being coupled to said input layer;
   an output section for outputting from said middle hidden layer information of color sensation.

4. The apparatus as claimed in claim 3, wherein
   said input layer of said neural network includes a plurality of units which number at least eighty one, and said middle layer between said input layer and said output layer includes a plurality of units which number at least ten.

5. An apparatus for non-linearly transforming color sensation information signals sensed by living bodies into multidimensional physical information, comprising
   an input section for transforming data of light describing a multidimensional spectral distribution of light into the form of an electrical signal and for sampling said data of light on a frequency coordinate axis in respect of a spectral intensity of light;
   an information transforming section connecting with said input section for transforming said electrical signal into a spectral distribution of light, said information transforming section comprising a feed-forward type neural network comprising an input layer of three or more units, an output layer of three or more units, and three or more hidden layers having a middle hidden layer including three units, said neural network being operative with a learning operation for translation of color sensation information signals sensed by living bodies; and
   an output section for presenting output electrical signals from said output layer of said neural network as multi-dimensional physical information; wherein
   said output signals constitute a multi-dimensional spectral distribution of light, said color sensation information signals sensed by living bodies having components representing a hue, a chrome and a value in the Munsel color system or components in a cylindrical coordinate corresponding to said hue, chrome and value or components in a three-dimensional rectangular-coordinate corresponding to said cylindrical coordinate in a one-to-one relationship.

6. The apparatus as claimed in claim 5, wherein said output layer of said neural network includes a plurality of units which number at least eighty one, and said middle layer between said input layer and said output layer includes a plurality of units which number at least ten, said neural network being implemented by a neuro-computer.

* * * * *